United States Patent [19]

Schmidt

[11] Patent Number: 4,711,280

[45] Date of Patent: Dec. 8, 1987

[54] VERTICAL FLAIL DELIMBER

[75] Inventor: Phillip A. Schmidt, Des Moines Marina, Wash.

[73] Assignee: Weyerhaeuser Company, Tacoma, Wash.

[21] Appl. No.: 885,353

[22] Filed: Jul. 14, 1986

[51] Int. Cl.⁴ .............................................. B27L 1/00
[52] U.S. Cl. ................................ 144/208 J; 144/2 Z; 144/341
[58] Field of Search .................. 144/2 Z, 3 D, 208 R, 144/208 J, 343, 341

[56] References Cited

U.S. PATENT DOCUMENTS 4,214,616 7/1980 Brisson ........................... 144/208 J

FOREIGN PATENT DOCUMENTS 1217449 12/1959 France ............................. 144/208 J
640706 1/1979 U.S.S.R. ........................... 144/208 J Primary Examiner—W. D. Bray

[57] ABSTRACT

A method and apparatus for delimbing a plurality of elongated tree stems includes at least a pair of vertically mounted, longitudinally offset flail members with flexible impact members mounted on rotatable drums. The drums rotate in the direction of stem flow through the flailing station and limbs and other debris can be collected within a defined area. A housing is structured to define a feed slot through the flailing station. In an alternate embodiment infeed rolls are provided to vertically orient the plurality of stems so that debarking as well as delimbing can be efficiently performed at the flailing station.

12 Claims, 6 Drawing Figures

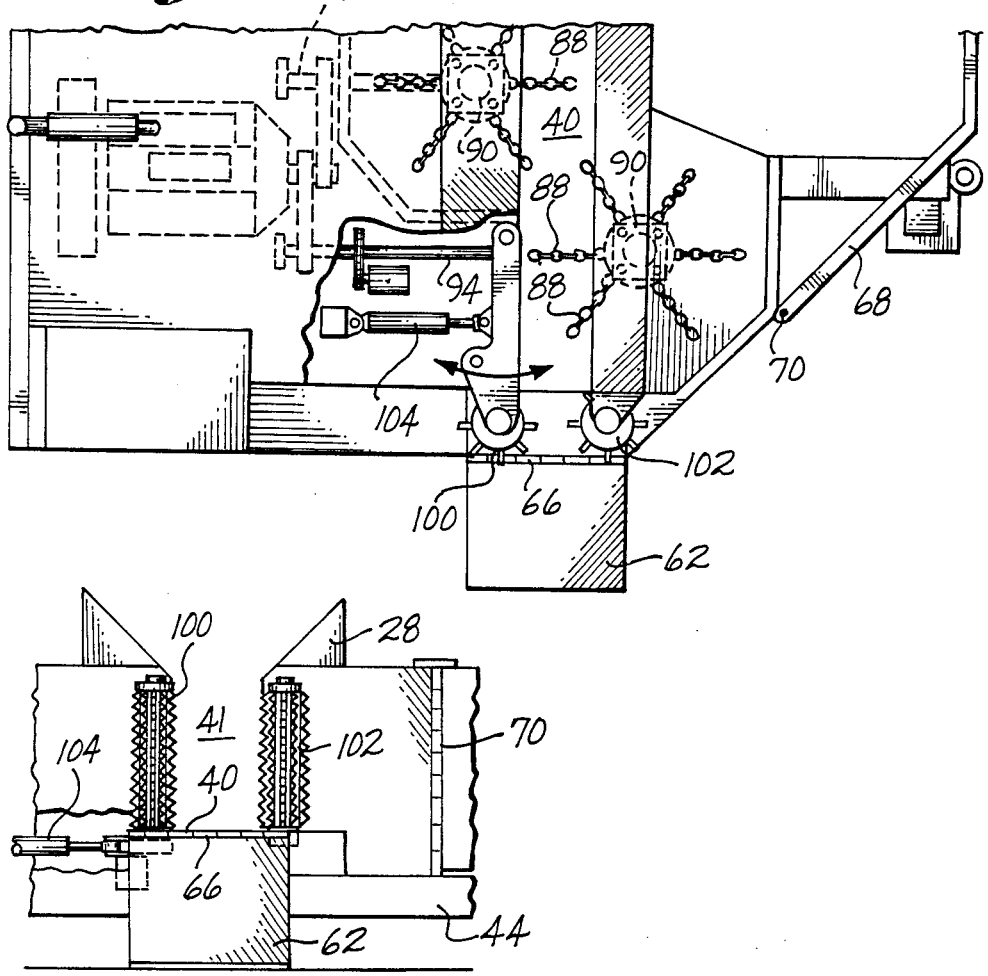

VERTICAL FLAIL DELIMBER

BACKGROUND OF THE INVENTION

This invention relates generally to a method and apparatus for delimbing and/or debarking elongated tree stems. More particularly it relates to a method and apparatus capable of delimbing a plurality of tree stems by motivating the stems through a delimbing station having a pair of offset vertically disposed flail members for knocking off the limbs and preferably for removing the bark substantially simultaneously.

In commercial forests today a substantial amount of relatively small timber is harvested and converted to many useful end products. In operations where tree thinning is performed to enhance the growth of the remaining trees, handling and processing systems are needed to efficiently and cost effectively handle the thinned trees. One of the common steps is the delimbing step where some means is used to remove the limbs and other foliage from the elongated stem. Flail means have been used in the past where flexible elements that are mounted on a rotating drum are caused to impact the stem where the limbs are attached. The force of the impact operates to break the limbs off the elongated stems.

One known flail delimbing apparatus has a rotating drum with chain segments mounted on the front end of a mobile prime mover. A collection of tree stems will be accumulated on the ground and the operator then drives the prime mover into a position where the moving chain segments are caused to impact the attached limbs and break them off. This apparatus leaves the debris and delimbed stems on the ground and another handling step is then necessary to dispose of the delimbed trees and resulting debris. This system also tends to leave short limb segments on the tree, at least on the sides of the trees that are facing the ground.

In the Swedish technical publication authored by T. Helgesson entitled "Flail Delimbing, A Bundle-Delimbing Method for Wood Removed in Thinning and Clearcutting Operations" (STFI Meddelande Series A, No. 472;4-21, 1978) there are disclosed several flail type machines for delimbing. One of the machines (depicted in FIG. 8 of the publication) has a horizontally mounted flail member at the back of a truck. The flail member is mounted on a carriage which moves back and forth over a plurality of tree stems laterally spaced on a deck.

Another machine is depicted in FIG. 7 of the publication and is a mobile delimbing apparatus having a pair of vertical axles on which chain segments are fastened. A gripper is used to pick up a bundle of trees and draws them through the rotating tools. The chains rotate against the direction of stem feed-through and, as the author states, the distance between the axles and the length of the chains is selected so that the chains touch each other when the axles rotate.

The present invention is an improvement in the type of flail delimbing machine just described having the vertical flail members. It was recognized that a plurality of elongated stems could be drawn through a vertical flail delimbing unit but adequate debris handling means should be provided and it was determined that an improved arrangement for the flail members with respect to the stem flow would result in improved delimbing and the possibility to also substantially debark the stems passing through the flail station.

Accordingly, from the foregoing, it is an object of the present invention to improve delimbing results in a vertical flail type delimbing machine.

Another object is to provide effective debris handling capability in the vertical flail delimber.

Yet another object is to provide a vertical flail machine that can debark elongated stems as well as the delimbing function.

Still a further object is to provide a vertical flail machine that is mobile and relatively inexpensive to manufacture and use.

These and other objects will become clear upon reading the specification to follow in conjunction with the attached drawings.

SUMMARY OF THE INVENTION

Briefly stated, this invention is practiced in one form by a vertical flail apparatus having a housing in which is mounted a pair of longitudinally offset substantially vertically upstanding rotatable flail members creating a flailing station. The housing has a front opening and a rear opening and in the preferred embodiment is open on the top. The flexible flail segments on the flail members are sized so that the segments extend a distance greater than half the lateral dimension of the opening extending through the housing. Means are provided to rotate the flail members in a direction with the flow of stems through the apparatus. Means are provided to feed a plurality of elongated stems through the housing past the offset flail members in the flailing station. Debris collection means may be provided to accumulate a substantial portion of the limbs, foliage and/or bark removed from the traveling stems.

DESCRIPTION OF THE DRAWINGS

FIG. 5 is a partially cut way top plan view of another embodiment which includes a pair of laterally spaced vertical infeed rolls.

FIG. 6 is a partially cut away frontal view also showing the infeed rolls.

DETAILED DESCRIPTION OF THE INVENTION

Figure 1:
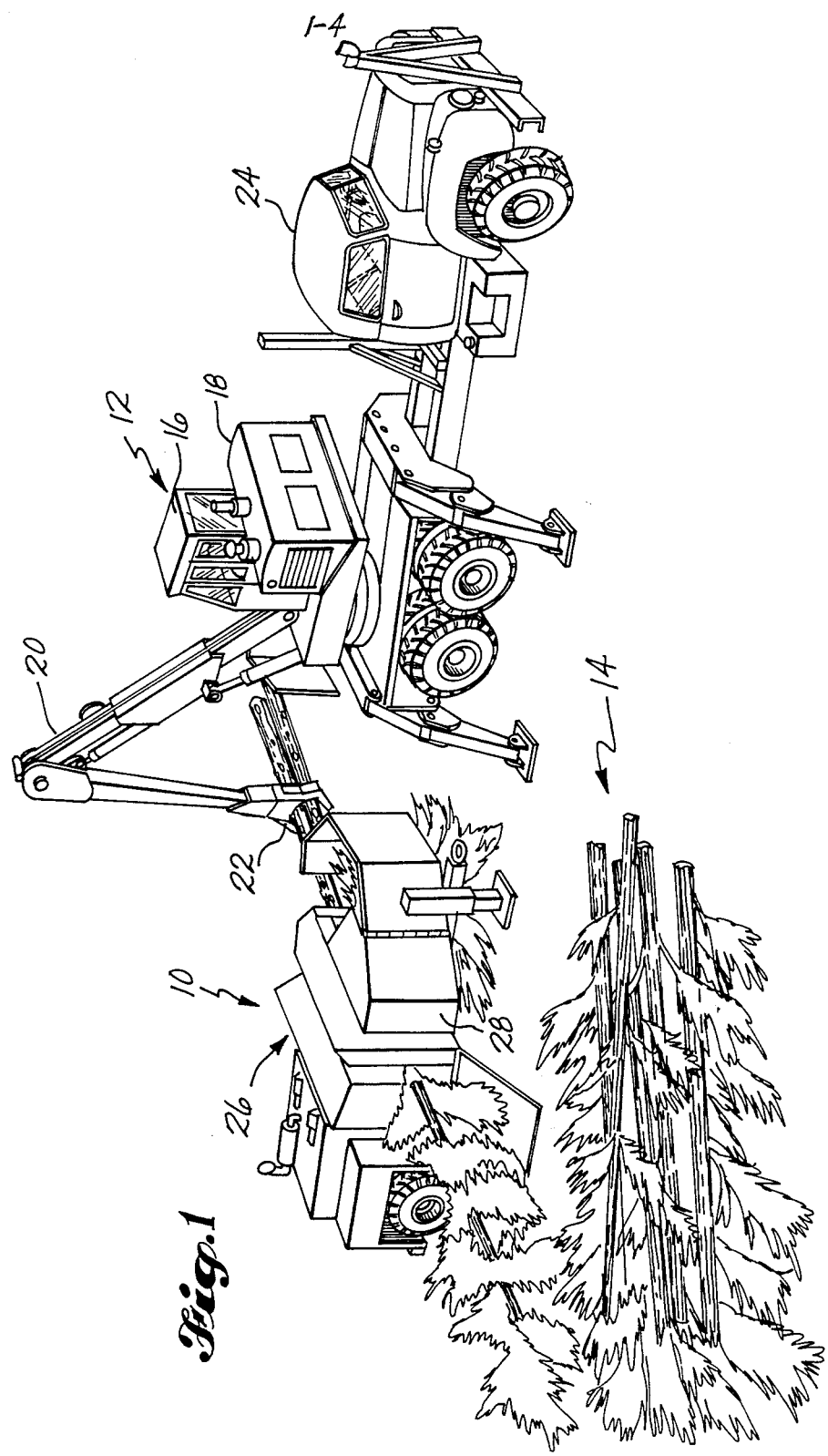
FIG. 1 is an isometric view showing the vertical flail apparatus in a setting for use with a plurality of tree stems being drawn through the flailing station.

Referring first to FIG. 1, a mobile vertical flail apparatus is generally indicated at 10, a truck mounted loader at 12, and a collection of elongated tree stems with limbs, foliage and bark at 14. The collection of stems 14 represents trees to be processed for the removal of limbs and/or bark in flail apparatus 10. Typically the stems will be relatively small, varying in diameter from about 2-12 inches. Loader 12 is typical of the type with a rotatable operator's cab 16, power plant 18, articulated boom 20, and controllable grapple 22 all mounted on truck 24. The operator, during operation picks up a collection of stems from collection 14 and causes them to feed through flail apparatus 10. Other means may be provided for feeding the collection of stems through flail apparatus 10.

Figure 2:
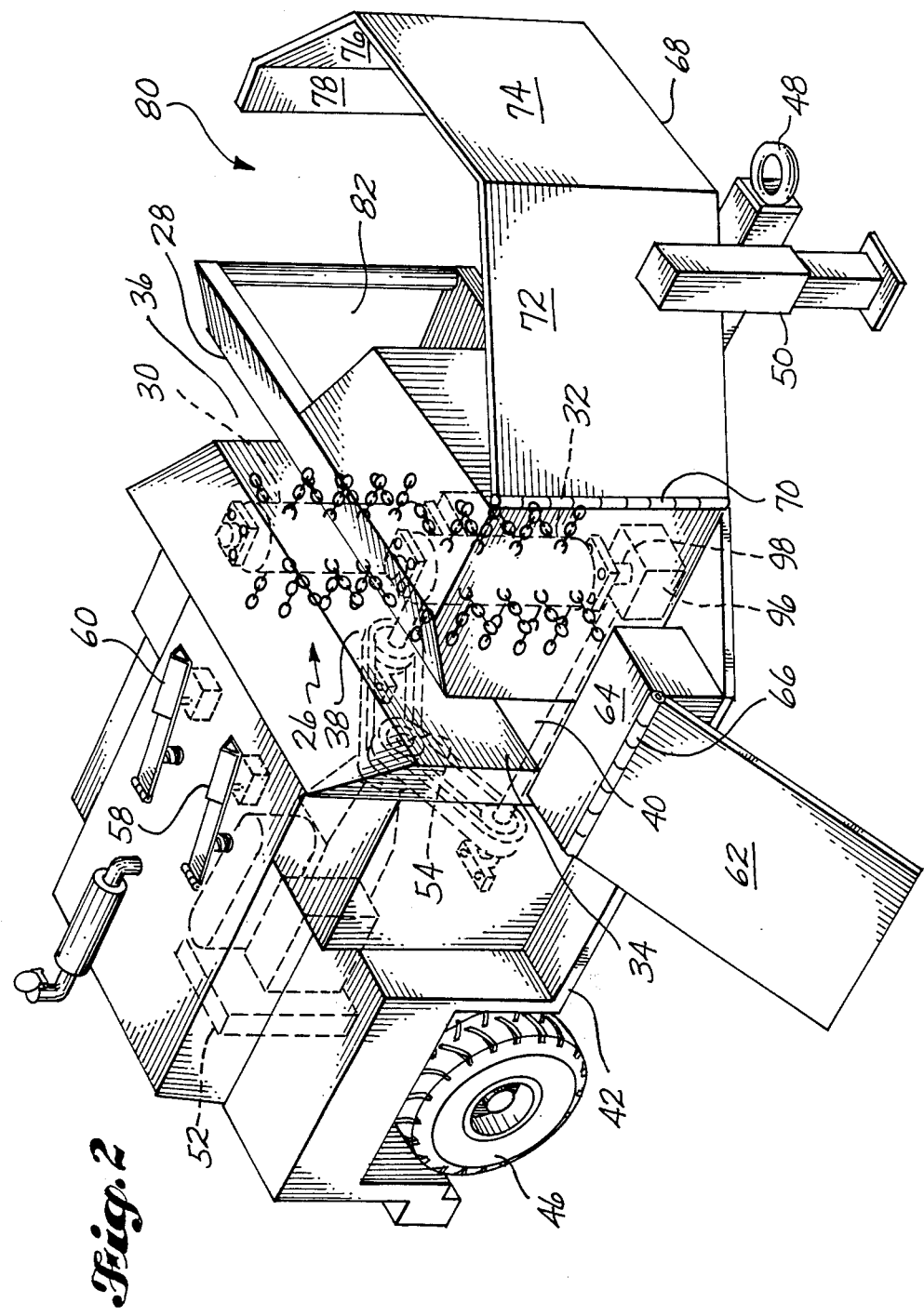
FIG. 2 is an isometric view showing the vertical flail apparatus mounted on a mobile structure and depicts the two longitudinally offset flail members in the flailing station.
Figure 3:
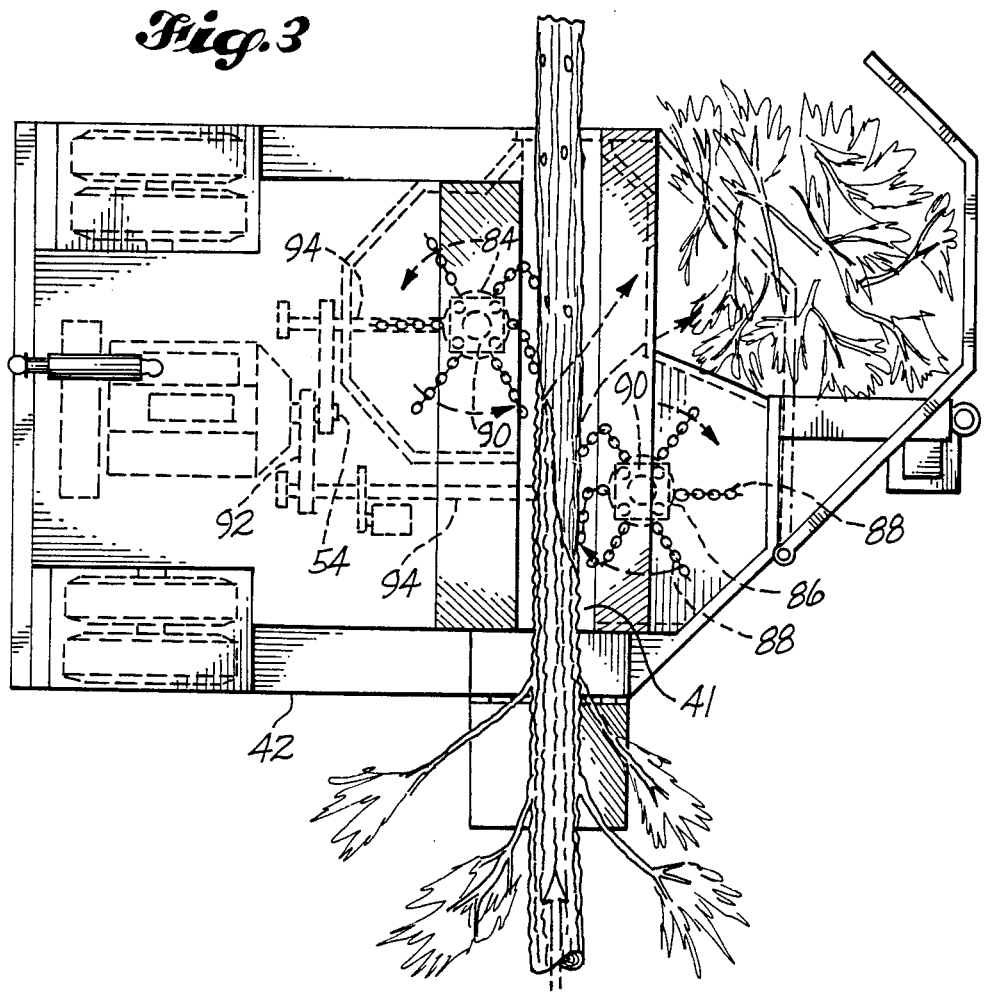
FIG. 3 is a top plan view depicting the flailing apparatus and a hinged wall member extended outwardly to form a debris collection pocket.
Figure 4:
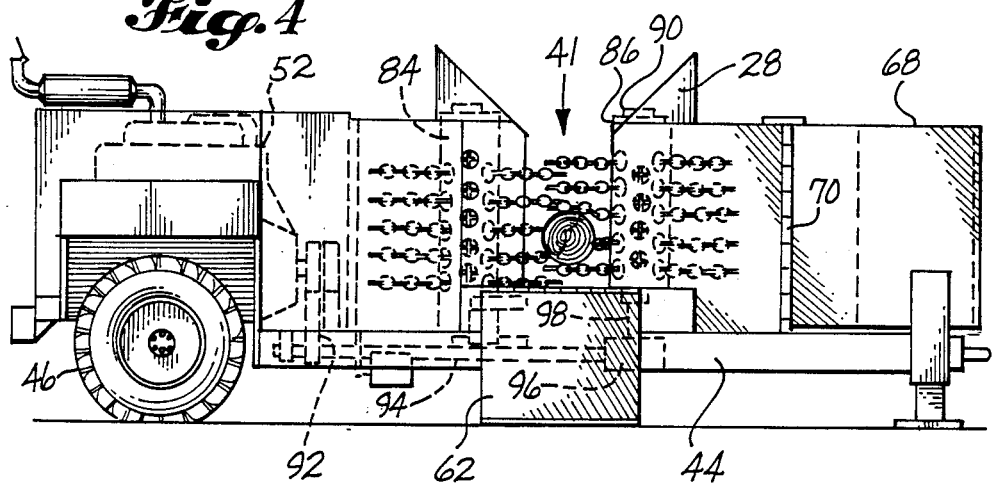
FIG. 4 is a frontal view with respect to the flow path of tree stems and shows the flexible flail segments in their rotating condition and their overlapping relationship.

Referring now particularly to FIGS. 2–4, the vertical flail apparatus 10 will be described in detail. Indicated generally at 26 is the flailing station through which a plurality of tree stems will be motivated for limb and/or bark removal. At flailing station 26 a structured housing 28 serves to, in part, house and support at least two vertically upstanding longitudinally offset flail members 30, 32. Housing 28 has a front opening 34 and a rear opening 36 and, in the emboidment depicted, housing 28 has a top opening 38. A floor 40 extends through flailing station 26 to generally support the stems in their travel through station 26 relative to flail members 30, 32. The opening defines a longitudinally extending vertical feed slot 41 through flailing station 26.

In the emodiment shown the housing 28 and flail members 30, 32 are part of a mobile trailer unit 42 with a substantially horizontal frame 44 on which is mounted wheels 46 and a front towing attachment 48 with height adjustment member 50. The flailing station 26 is mounted toward the front of trailer 42 and the power source 52 to drive flail members 30, 32 is mounted toward the rear. Power source 52 can be comprised of any suitable power generating means such as a diesel power plant capable of providing power to an output shaft 54. Mounted atop the power plant housing 46 are two bump switches 58, 60 one of which is a switch for interrupting power to the flail members while the other is a switch to engage the flail members. As should be apparent from FIG. 1 bump switches 58, 60 are used by the operator in cab 16 by manipulation of grapple 22.

The feed slot 41, in the embodiment shown, extends transversely with respect to the center line of the trailer unit 42 on which it is mounted. Just below floor 40 at the front opening 34 is an inclined ramp 62 and horizontal plate member 64. Ramp 62 is hinged along hinge 66 to be pivoted upwardly against housing 28 for transport. During operation ramp 62 aids the feeding of stems into and through feed slot 41. Another hinged member, debris collection and deflector wall 68 is attached to housing 28 along vertical hinge 70 located at the front corner of housing 28. Collection and deflector wall 68 is comprised of four vertically extending angled wall members 72, 74, 76 and 78. Again, for transport, the collection and deflector wall 68 is pivoted inwardly toward housing 28 so as to be adjacent the walls of the housing where it can be locked in place during transport. At the operating site it will be pivoted outwardly as depicted in FIG. 2 to form a debris collection pocket generally indicated at 80.

In addition to the feed slot 41 extending through flailing station 26 an additional opening indicated at 82 can be provided in housing 28 as a debris exit. As will be more fully explained, the flail members 30, 32 generate limbs, bark, and the other debris (depending on what the stems contain) in the flailing station and the dynamic forces exerted by the flails cause the resulting removed material flow to travel in a path as indicated by the flow arrows in FIG. 3. Since the path is substantially uniform the opening 82 allows substantially all of the limbs and debris to be motivated outwardly where the collection and deflector wall functions to accumulate the debris within a confined volume. When a predetermined amount of debris is accumulated, it will be removed by any suitable debris removal means for subsequent disposal. If opening 82 is not provided, the debris will stay within slot 41 and flow out of the flailing station 26 through rear opening 36. Without the side debris opening 82 there will be no need to provide collection and deflector wall 68.

As may be seen by referring to FIG. 3, flail members 30, 32 are longitudinally spaced apart and are spaced laterally so each rotatable drum 84, 86 is spaced outwardly from the vertical side planes of feed slot 41. Flail members 30, 32 each include a plurality of chain segments, each indicated at 88, substantially uniformly spaced about and fixed to their respective drums 84, 86. Segments 88 are perferably removably mounted so as to provide ease of maintenance. Flails of this type are well known and have been used for delimbing and debarking tree stems. The length of chain segments 88 is selected so that when flail members 28, 30 are rotating the segments will extend by centrifugal force a distance which is greater than one half the width dimension of vertical slot 41 (see FIGS. 4 and 5).

A suitable type of chain flail member to use for delimbing and debarking because of its debarking efficiency is the flail member disclosed in U.S. Pat. No. 4,640,325, assigned to the assignee of the present invention. While single chain segments of substantially uniform length will be adequate to perform the delimbing function and most debarking the chain flail members disclosed in the aforementioned U.S. patent offer excellent performance for delimbing and debarking to a bark content of less than 1% left on the stems. The disclosure of the aforementioned U.S. patent is hereby incorporated herein by this reference. The chain segments 88 are arrayed in a spaced arrangement to provide substantially complete chain coverage up the sides of feed slot 41 (see FIG. 4) so all limbs of a collection of stems being transported through station 26 will be impacted by one or more of segments 88 and ideally so that all stem surfaces will be impacted to remove the bark.

Each drum 84, 86 is mounted in vertically spaced bearings each indicated at 90, which are in turn mounted suitably within housing 28. Extending below the plane of floor 40 is the means to drive drums 84, 86. In the embodiment depicted the power provided by power shaft 54 is carried via drive belts 92, lateral shafts 94, and gear boxes 96 to stub shafts 98 extending downwardly from the bottoms of drums 84, 86 which are driven at the correct predetermined rotational speed and direction.

The embodiment depicted in FIGS. 5 and 6 includes a pair of laterally opposed vertically extending infeed rolls 100, 102 one of which may be driven to assist in the transport of stems. This emobidment includes the infeed rolls 100, 102 to enhance the feed characteristics for the debarking function. One of the rolls, 100 in the embodiment depicted, is pivotally mounted with a biasing operating cylinder 104 provided to urge the roll against the stems being transported through station 26. Preferably each roll 100, 102 is toothed to further assist in the feeding function. In addition, the infeed rolls being biased toward each other function to spread a collection of stems into a more vertically arrayed side-by-side arrangement and it is this vertical array for the stems that allows more complete debarking as well as excellent delimbing.

OPERATION OF THE INVENTION

Upon arrival at an operating site the present invention will be set up for use. While the preferred embodiment is a mobile unit, the flailing station could be mounted at a stationary location and tree stems continuously brought to it and fed through at least one at a time but preferably in collections of stems to significantly increase productivity.

In the mobile version apparatus 10 is towed to the preselected site and properly leveled. The pivotal wall is moved into position to form the debris collection and deflector wall 68 and ramp 62 is pivoted downwardly to provide the entry ramp to feed slot 41. Power source 52 is started up to deliver power to shaft 54.

A collection of tree stems is located alongside the delimbing apparatus and the operator in cab 16 then begins operation by hitting the "on" bump switch which activates the pair of flail members 30, 32. Each flail is caused to rotate in a direction with the direction the stems as they will be propelled through slot 41. The operator then grasps a collection and locates it over and in-line with slot 41. The collection is then moved downwardly into slot 41 and moved longitudinally past flailing station 26. The chain segments 88 will, of course, be oriented in horizontal planes by centrifugal force until each one impacts a stem surface or a limb where they will impact some of the energy into impact energy that severs the limbs from the stems and knocks bark from the surfaces. The flail members 30, 32 act to propel the removed debris in a direction toward the debris exit 82 and into the collection area confined within wall 68 or in the alternate embodiment directly out of rear opening 36. The stems continue through slot 41 and the operator will then place the collection of now delimbed stems into another pile, onto a truck, or directly into a chipping apparatus.

In the embodiment of FIGS. 5 and 6 when flailing station 26 is also functional to remove substantially all of the bark on the stems as well as the limbs the operator will similarly grasp a collection of stems toward their bottom end or about in the middle of the collection. The bottom ends are then manipulated to enter the space between feed rolls 100, 102 where they will function to urge the stems to become aligned in a vertically spaced arrangement for travel through station 26. In this arrangement flail members 30, 32 are better able to perform the dual function of delimbing and debarking.

During operation it has been found that if the drums are rotated at from between 500–600 RPM with a feed rate of from 75–150 ft./min. satisfactory results may be obtained. If clean stems are to be fed directly into a chipping apparatus the feed rate will be tied to an acceptable infeed rate for the chipper.

While a detailed description of several embodiments of the invention has been provided changes and modifications may occur to those with skill in the art. All such changes and modifications are intended to be included within the scope of the following claims.

I claim:

1. A flailing apparatus for substantially delimbing and/or debarking at least one elongated tree stem comprising:
   a housing having at least front and rear openings,
   at least two rotatable flail members mounted in the housing with one being longitudinally and laterally offset from the other and each being substantially vertically upstanding within the housing,
   a plurality of flexible flail segments mounted on each flail member sized so that the segments will extend a distance greater than half the lateral dimension of the opening extending through the housing when the flail members are rotated, and
   means for rotating the flail members.

2. The apparatus as in claim 1 in which the housing is substantially open on the top.

3. The apparatus as in claim 1 including means for motivating at least one tree stem through the opening extending through the housing.

4. The apparatus as in claim 3 in which the flail members rotate in the direction with the flow of stems through the opening.

5. The apparatus as in claim 3 in which the motivating means causes a plurality of tree stems to pass through the housing by the flail members in a substantially vertically stacked array.

6. The apparatus as in claim 3 in which a pair of laterally opposed substantially vertically extending feed rolls is provided for at least assisting in the motivation of stems through the apparatus.

7. The apparatus as in claim 6 in which at least one of the rolls is a driven roll.

8. The apparatus as in claim 6 in which at least one of the rolls is pivotally mounted and biased toward the other.

9. The apparatus as in claim 1 in which the housing is on a mobile trailer.

10. The apparatus as in claim 1 further including a debris collection and deflector wall attached to the housing for deflecting and collecting debris within a collection pocket.

11. The apparatus as in claim 10 in which the wall is hingedly connected to the housing.

12. The apparatus as in claim 10 in which an additional opening in the housing is located downstream from the flail members and is sized to permit debris to flow outwardly therefrom.

* * * * *

UNITED STATES PATENT AND TRADEMARK OFFICE
CERTIFICATE OF CORRECTION

PATENT NO. : 4,711,280
DATED : December 8, 1987
INVENTOR(S) : Phillip A. Schmidt It is certified that error appears in the above-identified patent and that said Letters Patent is hereby corrected as shown below:

In column 5, line 24, "impact" should read --impart--.

Signed and Sealed this

Twelfth Day of July, 1988

Attest:

DONALD J. QUIGG

*Attesting Officer*

*Commissioner of Patents and Trademarks*